United States Patent [19]
Hughes

[11] 3,793,815
[45] Feb. 26, 1974

[54] TREE SHAKER

[75] Inventor: Guy O. Hughes, Marysville, Calif.

[73] Assignee: John C. Woudstra Mid State Mfg. Co., Manteca, Calif.

[22] Filed: Jan. 29, 1973

[21] Appl. No.: 327,592

[52] U.S. Cl. ............................................ 56/328 TS
[51] Int. Cl. ............................................ A01g 19/00
[58] Field of Search ........................ 56/328 TS, 329

[56] References Cited
UNITED STATES PATENTS

| | | | |
|---|---|---|---|
| 3,683,617 | 8/1972 | Vallicella | 56/329 |
| 3,548,578 | 12/1970 | Shipley, Jr. | 56/328 TS |
| 3,392,517 | 7/1968 | Nye | 56/328 TS |
| 3,596,455 | 8/1971 | Adrian | 56/329 |
| 3,460,29 | 8/1969 | Overstreet, Jr. | 56/328 TS |

Primary Examiner—Russell R. Kinsey
Assistant Examiner—J. N. Eskovitz
Attorney, Agent, or Firm—Lothrop & West

[57] ABSTRACT

Suspended from a forwardly projecting boom is a pair of fore and aft elongated tree gripping arms pivotally connected at their after ends. The forward ends of the tree gripping arms are movable between an open position and a closed position wherein the trunk of the tree is clamped. Dissimilar weights in each of the forward tree clamping ends of the arms are rotated at different velocities to produce random, non-repetitive, vibrational frequencies and amplitudes effective to dislodge the crop from the tree being shaken. A three point suspension allows the tree gripping arms to roll, within limits, about a central fore and aft axis so that the clamping jaws automatically conform to the attitude of the tree trunk being gripped. Elevation of the clamping jaws is controlled by lifting and lowering the boom. If desired, the shaker can be mounted on a self-propelled vehicle.

12 Claims, 8 Drawing Figures

TREE SHAKER

The invention relates to improvements in devices for shaking a tree to dislodge the crop therefrom.

The market place as well as the patent literature are replete with tree shakers of numerous different kinds. So far as is known, however, the prior art shakers have utilized an identical pair of eccentrically weighted members rotated at different speeds and at different out-of-phase relationships. These prior arrangements have afforded a variety of vibrational frequencies and amplitudes, but are characterized by repetitive patterns. That is to say, although the directions of thrust resulting from the two identically constructed (although out-of-phase) weight members can vary, as can the amplitude nodes depending upon when the weights come into apposition and opposition; a plot of these forces will ordinarily disclose a pattern of a cyclical nature, even during the relatively short time that a tree trunk is being shaken. As a consequence, the dislodging effect of the shaker is limited for the most part, to the frequencies, and vectorial thrust forces contained in but a single one of the cycles. If the tree happens not to respond to the particular frequencies and amplitudes of the cycle, considerably less than total crop dislodgment results.

It is therefore an object of the invention to provide a tree shaker which imposes a random vibrational effect during the entire tree shaking period.

It is another object of the invention to provide a tree shaker which is effective in every instance to dislodge all or substantially all of the crop from the tree being shaken.

It is still another object of the invention to provide a tree shaker which does not twist or otherwise damage the trunk.

It is a further object of the invention to provide a tree shaker having pivoted clamping arms of long radius so that the clamping jaws engage the tree trunk substantially on a true diameter.

It is yet a further object of the invention to provide a tree shaker in which the vibrational frequency and vectorial forces can be changed to suit the particular characteristics of the crop being harvested.

It is an additional object of the invention to provide a tree shaker which is economical with respect to original acquisition cost as well as upkeep.

It is still a further object of the invention to provide a tree shaker which is low is profile and highly maneuverable.

It is yet a further object of the invention to provide a tree shaker which is operated by only one person, is self-propelled and can readily be moved from orchard to orchard under its own power if necessary.

It is another object of the invention to provide a generally improved tree shaker.

Other objects, together with the foregoing, are attained in the embodiment described in the following description and illustrated in the accompanying drawings in which:

FIG. 5 is a fragmentary top plan view, to a greatly enlarged scale, of the left arm rotating weight structure;

FIG. 6 is a fragmentary top plan view, to a greatly enlarged scale, of the right arm rotating weight structure;

Figure 1:
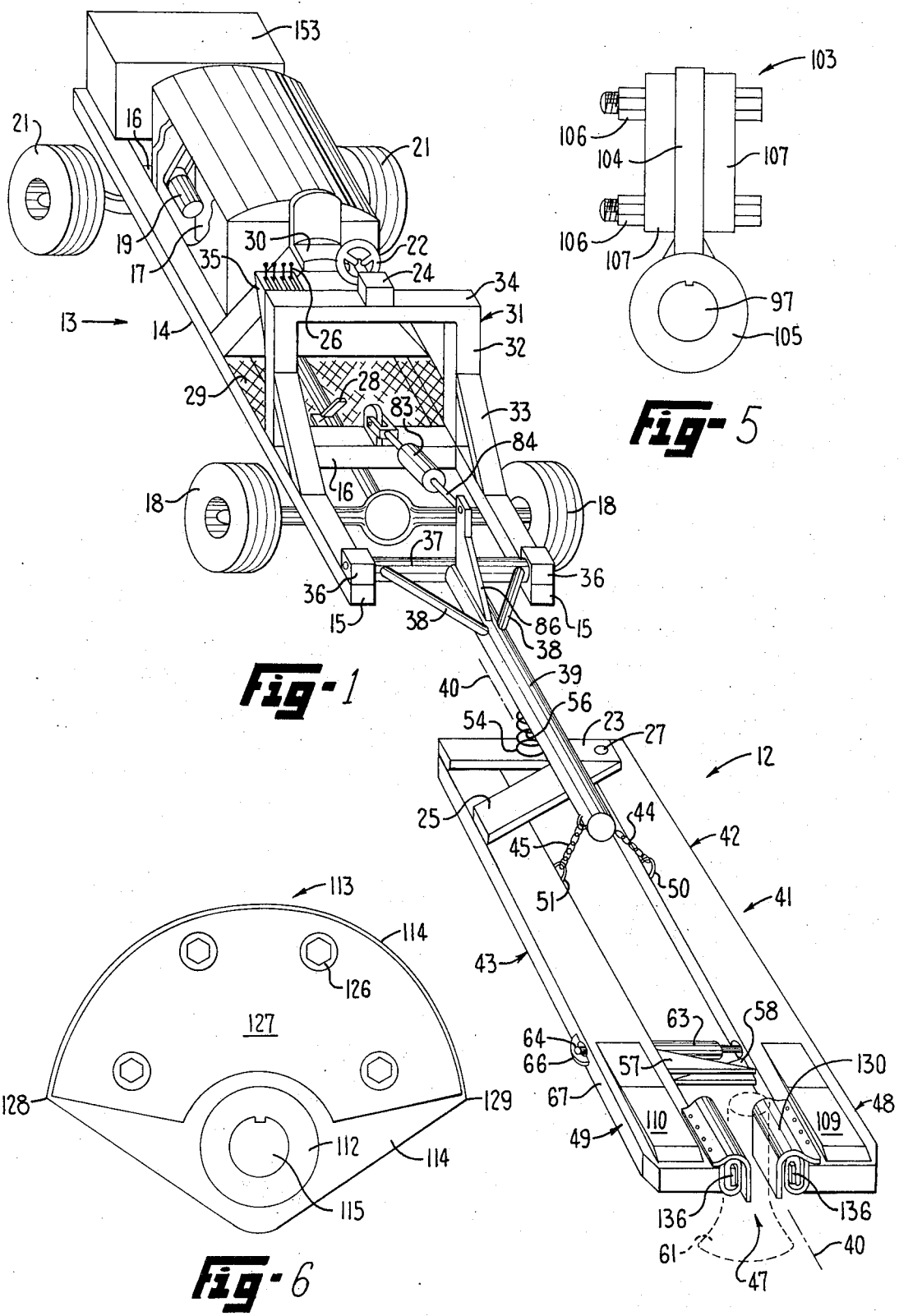
FIG. 1 is a front perspective view of the shaker.

While the tree shaker of the invention is susceptible of numerous physical embodiments, depending upon the environment and requirements of use, a prototype similar to the embodiment disclosed herein has been made and tested, and has performed in an eminently satisfactory manner.

The tree shaker of the invention, generally designated by the reference numeral 12, preferably includes a self-propelled vehicle 13 comprising a chassis 14 made up of a pair of fore and aft box channels 15 and suitable transverse structural members 16 at the front and rear of the chassis.

An engine 17 mounted on the chassis affords power to the front wheels 18 of the vehicle as well as to the hydraulic pump 19 located adjacent the engine.

Steering of the two rear wheels 21 is effected by a steering wheel 22 on the after end of a steering column connected to the control box 24 of a conventional hydraulic power steering mechanism, for example, of the well-known Orbiter type (now shown).

A brake pedal 28 located on the forward end of an expanded metal flooring 29 gives braking capabilities to the vehicle under the control of an operator seated on the seat 30.

Conveniently located in front of the operator on a vertical transverse frame 31, including a pair of upright posts 32, forward braces 33 and a top cross beam 34, is a console 35 comprising an array of hydraulic control valves 26, subsequently to be described in detail. Manipulation of the control valves 26 can be effected by one hand while with the other hand the operator concurrently steers the vehicle.

Fore and aft motion of the vehicle is effected by means of a suitable transmission having forward and reverse capabilities. The transmission is selected so that it not only enables the vehicle quickly to shift from forward to reverse but also to move either fore or aft at a brisk pace, thereby affording a highly maneuverable machine.

The forward end portions of the fore and aft box channels 15 extend forwardly beyond the vertical transverse frame 31 and support on their extreme forward ends a pair of trunnion bearings 36 having journaled therein a transverse trunnion shaft 37 on the center of which is mounted a fore and aft boom 39. A pair of struts 38 braces the T-shaped trunnion and boom structure.

The boom 39, in turn, supports a pair of tree gripping arms 41 comprising a first, left-hand arm 42 and a second, right-hand 43, when viewed from the driver's seat 30. The right-hand arm 43 includes, adjacent its after end, a transverse connector plate 23 and an angle brace 25. The plate 23 is pivotally mounted on the after end of the arm 42 by pivot pin 27. The pivot connection enables the arms 42 and 43 to pivot, or swing, between a first, spaced-apart position and a second tree-clamping position.

The tree gripping arms 42 and 43 are supported in part by a respective pair of chains 44 and 45 mounted on the corners of the forward end of the boom 39, as appears most clearly in FIG. 1. The two chains 44 and 45 are appropriately secured to the respective gripping arms 42 and 43 as by a pair of rings 50 and 51 welded to the arms approximately one third of the distance from the after end of the arms 42 and 43 toward the front end thereof.

A flexible three point suspension of the gripping arms is provided so that the arms are not only self-levelling but are automatically capable of rolling, or twisting, about a central fore and aft axis 40. Thus, when the two opposed tree-gripping jaws 47 formed by the forward ends 48 and 49 of the respective arms 42 and 43 clamp the trunk 61 of a tree, the jaws 47 can roll, or tilt, about the axis 46 so as to conform precisely to the attitude of the tree trunk being clamped.

The two rings 50 and 51 anchoring the respective chains 44 and 45 form the forward two suspension points of the three point suspension. The supporting structure 54 forming the third point of suspension is located on the fore and aft axis 46 of the arms on the top of the connector plate 23. The third point of suspension includes a helical spring 56 attached at its upper end to the boom 39 and at its lower end to the connector plate 23. The helical spring 56, being yieldable, allows the arm structure 41 to roll, within limits, about the longitudinal axis 40 to assume the inclination of the tree trunk 61, and, being resilient, the spring returns the gripping arms to base position when the tree trunk is released.

The vertical stiffness and dimension of the spring 56 are such that in base position, the two gripping arms 41 are held substantially parallel to the boom 39. As the boom is lifted, so also are the gripping arms elevated. The spring 56, in conjunction with the suspension chains 44 and 45 provide, in other words, a yieldable, self-levelling, three-point suspension which automatically returns to base position under the combined influence of gravity and spring tension. When in base position, the compression of the spring balances the excess of weight of the arms forward of the fulcrum points 50 and 51 located approximately one third of the length, from aft to forward, on the arms.

Figure 2:
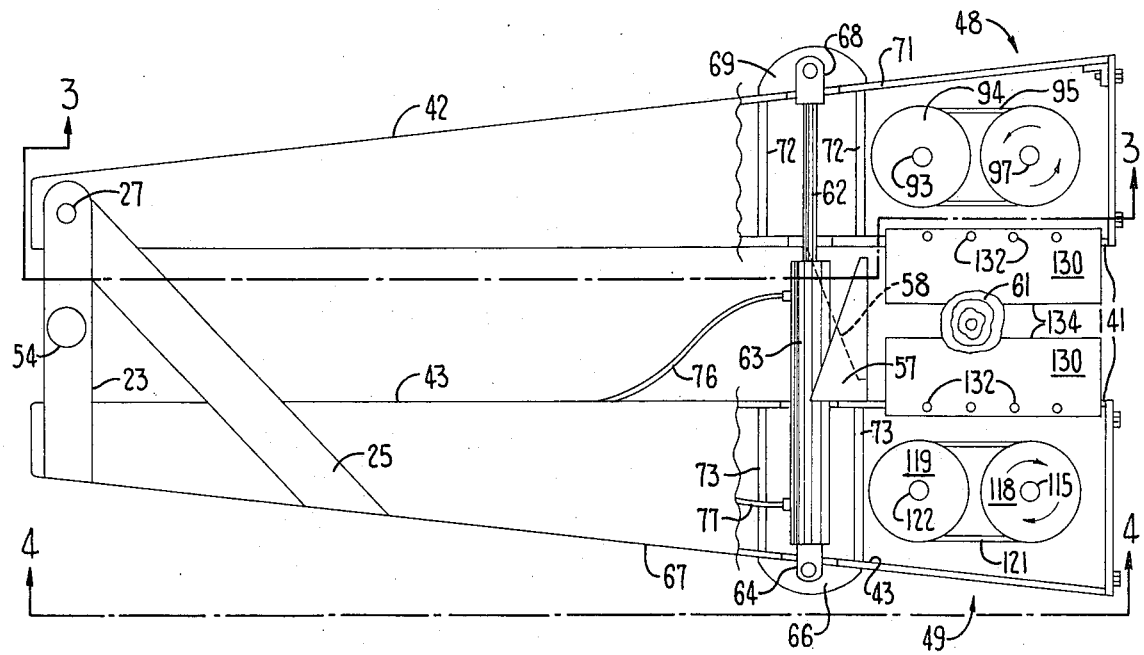
FIG. 2 is a top plan view, to an enlarged scale, of the tree gripping arms, with portions of the housing at the forward ends of the arms being broken away to reveal interior details.

It is especially to be noted, as another important feature of the present shaker, that the fore and aft gripping arms 42 and 43 are considerably longer than the gripping arms customarily encountered in prior art shakers. The effective radius of the arms is so long, in fact, that when the two arms 42 and 43 are moved into tree clamping position, as shown in FIG. 2, the tree trunk 61 is gripped on virtually a true diameter at right angles to the median, fore and aft axis 40 of the gripping arms 42 and 43. As a result, twisting of and damage to the cambium layer is minimized as shaking occurs.

Opening and closing of the tree gripping jaws 41 and 42 is effected by corresponding extension and retraction of a plunger 62 actuated by a hydraulic cylinder 63 formed with a clevis 64 pivotally mounted on a plate 66 secured to the outer wall 67 of the right arm 43. In a comparable fashion, a clevis 68 on the end of the plunger 62 is pivotally mounted on a plate 69 on the outer wall 71 of the left arm 42.

A spaced pair of transverse bulkheads 72 on the left arm 42 and a corresponding pair of transverse bulkheads 73 on the right arm 43 provide great rigidity and resistance to buckling in opposition to the strong force exerted by the plunger 62, particularly as the plunger is forcefully retracted into tree clamping position.

Hydraulic hoses, namely, a pressure line 76 and a return line 77, are connected to the ends of the tree clamping cylinder 63 and to the customary fittings on a clamping control valve 78 on the valve console 35 located on the top cross beam 34, as previously explained.

Figure 8:
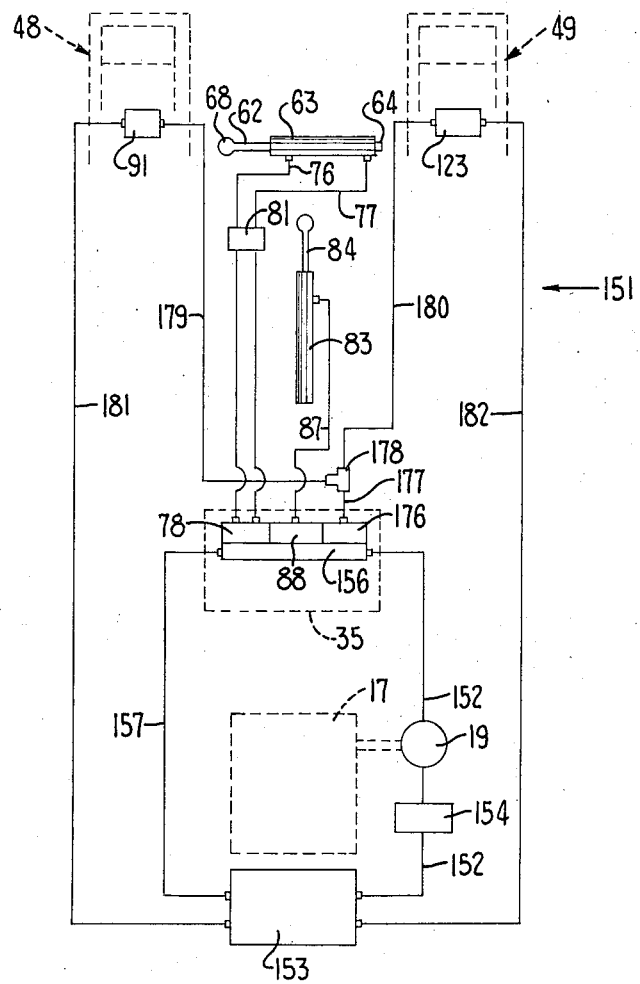

As appears most clearly in FIG. 8, a conventional locking valve 81 is interposed in the pressure line 76 and the return line 77 so that when the clamping control valve 78 is moved to "clamp" position, the plunger 62 will retract into the cylinder 63 and securely remain in retracted position despite the buffeting given to it by the violent agitations of the tree shaking heads at the forward ends 48 and 49 of the respective arms 42 and 43. When shaking is terminated and the clamping control valve 78 is manually moved to "open" or "unclamp" position by the driver-operator, the locking valve 81 is automatically deactivated, in well-known manner, and the plunger 62 is extended to open position, thereby opening the clamping jaws at the forward ends 48 and 49, and releasing the tree trunk 61 so that the shaker vehicle can proceed to the next tree. A horizontal upper triangular plate 57 mounted on the inner side of the right arm 43 partially overlaps, in plan, a lower triangular plate 58 on the left arm 42 (see FIGS. 1, 2 and 3) thereby guarding the cylinder 63 from accidental damage from a tree trunk as the vehicle is moved ahead into shaking position.

Lifting of the tree gripping arms 42 and 43 to the desired elevation is effected by a hydraulically actuated mechanism, including a cylinder 83 having its after end pivotally mounted on the front cross channel 16. A plunger 84 extends from the forward end of the cylinder 83, the forward end of the plunger 84 being connected to a boom lifting lever 86 secured to the upper after end of the lifting boom 39. By retracting the plunger 84, the boom 39 is lifted, thereby also elevating the tree gripping arms. Only a single hydraulic line 87 from the boom lifting valve 88 to the boom lifting cylinder 83 is necessary, namely, a line which will cause the piston head to retract the plunger 84 into boom elevating position. When it is desired to lower the boom, it is merely necessary to open the valve 88, the weight of the boom being sufficient to drive the hydraulic fluid back into the line and allow the plunger to extend to its initial projected position so that the boom can descend.

One of the major features of the present device is the vibration inducing system comprising two dissimilar, eccentric, rotating weight mechanisms 89 and 90 in the two respective vibrating heads 48 and 49 at the forward ends of the tree gripping arms 42 and 43, respectively.

Figure 3:
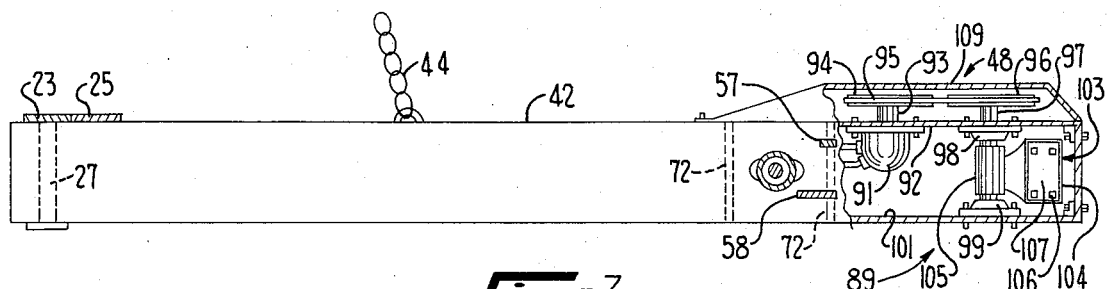
FIG. 3 is a side elevational view of the left-hand arm shown in FIG. 2, with portions of the housing broken away to disclose the rotating weight structure of the left arm.

The left-hand vibrating head 48, as appears most clearly in FIGS. 2 and 3, includes a hydraulic motor 91 mounted on the top panel 92 of the hollow vibrating head 48 so that the shaft 93 rotated by the motor is in vertical attitude. A drive pulley 94 on the shaft 93 drives a belt 95 which, in turn, rotates a driven pulley 96 connected to a shaft 97 journaled in bearings 98 and 99 mounted on the top panel 92 and the bottom panel 101, respectively, of the vibrator head 48.

Mounted on the rotating shaft 97 is a first, left hand, eccentric mass 103 comprising a radial plate 104 mounted in vertical attitude on a collar 105 suitably keyed to the shaft 97. Mounted by suitable fastenings 106 on opposite faces of the plate 104 is a pair of blocks 107 of heavy material, such as lead.

One of the unique characteristics of the left-hand eccentric mass 103 is that when viewed in plan, the weight mass (not counting the protruding fasteners 106) subtends but a relatively small arc, e.g. 45°, measured from the rotational axis of the shaft 97 as a center. On the other hand, when viewed in side elevation, as in FIG. 3, the vertical extent of the weight mass is substantially the same as the vertical portion of the shaft 97 measured between the journal bearings 98 and 99.

The right hand, or second, eccentric weight mass 113, however, is quite different from the first weight 103, just described, and the marked distinctions both in configuration, extent, relative size and weight, as well as difference in moment of inertia, all serve to yield a highly random, non-repetitive type vibration, particularly when the two dissimilar weight structures are rotated at different angular velocities.

Figure 4:
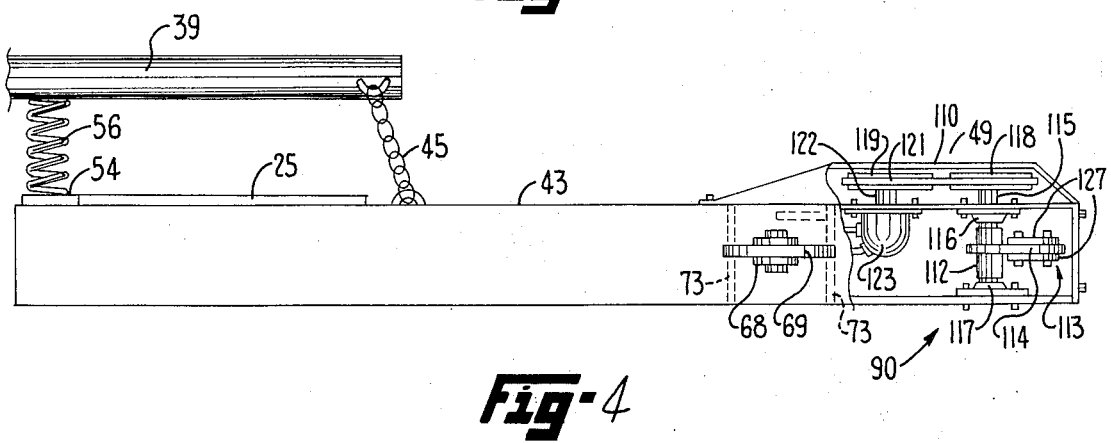
FIG. 4 is a side elevational view of the right-hand arm shown in FIG. 2, with portions broken away to reveal the rotating weight structure of the right arm.

The second eccentric mass 113, as appears most clearly in FIGS. 4 and 6, includes a fan shaped mounting plate 114 mounted horizontally on a collar 112 keyed to a shaft 115. As before, the shaft 115 is journaled in bearings 116 and 117 and is rotated by pulley 118 driven by drive pulley 119 by means of a belt 121. The drive pulley 119 is mounted on a shaft 122 rotated by hydraulic motor 123.

The horizontal fan shaped plate 114 has mounted on the upper and low faces, by fasteners 126, a pair of arcuate lead plates 127. The arc subtended in plan by the two outer end corners 128 and 129 (see FIG. 6) of the lead plates 127 is preferably at least 170°, the subtended arc thus being in the neighborhood of 3½ to four times the arc in plan subtended by the vertically aligned first weight mass 103. On the other hand, as appears most clearly in FIG. 4, the vertical extent of the second weight mass 113, as viewed in side elevation is approximately only one-half the vertical height of the first weight mass 103.

In order to shield the respective weight mechanisms 89 and 90, removable protective covers 109 and 110 are provided.

In sum, as previously pointed out, the substantial differences in geometry, mass, alignment and rotational velocities of the two weight systems imposes unique vibrational forces upon the respective shaker heads and gripping jaws, and thus upon the tree itself. The amplitudes and frequencies appear to vary over a wide spectrum during the relatively few seconds during which shaking occurs, and without any repititious patterns of a cyclical nature. The totally random motions seem to account for the very high recovery rate; different fractions of the crop appear to require their own particular frequency direction and amplitude of vibration before being dislodged. By providing a wide range of different pulses, the entire crop is shaken loose in substantially every case.

As previously stated, the long radius of the gripping arm structure, which allows clamping to take place substantially on a true transverse diameter of the trunk, and the ability of the gripping arm structure to roll about a fore and aft axis so as to accommodate to the attitude of the tree trunk being gripped, are two effective ways of minimizing twisting and consequent abrasion of the bark.

Still another feature which reduces damage to the cambium layer is the cushioning afforded the gripping surfaces of the clamping jaws. Thus, as appears most clearly in FIGS. 1 and 7, the gripping jaws 47 include an opposed pair of buffering cushions 130 fabricated of sheets 131 of an elastomeric material with a considerable coefficient of surface friction, such as rubber. Each of the sheets 131 is mounted by suitable fasteners 132 on the respective upper inner edges of the two vibrating heads 48 and 49 located at the forward ends of the respective clamping arms 42 and 43. The buffering sheets 131 extend inwardly toward each other from their horizontal mountings and drape downwardly into vertical attitude to form a pair of spaced parallel trunk-engaging portions 134.

Backing up each of the depending sheet portions 134 is a pad 136 comprising a thick plate 137 of elastomeric material recurved upon itself to form a roll 138 with an overlapping portion 139. Securing the pad 136 to the adjacent side wall 141 of the vibrating head are appropriate fasteners 142 extending through a backing plate 143 within the roll 138 and through the over-lapping portion 139 of the pad 136.

Figure 7:
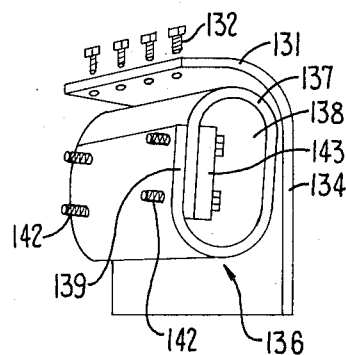
FIG. 7 is a front perspective view, to an enlarged scale, of the elastomeric padded construction of the left-hand one of the tree clamping jaws as it appears in FIG. 1; and, FIG. 8 is a schematic diagram of the shaker's hydraulic system.

As appears most clearly in FIGS. 1, 2 and 7, the buffering cushions 130 engage the trunk 61 of the tree when the clamping jaws 47 are in closed position and, being of deformable material as well as possessing a substantial coefficient of friction, the jaws not only grip the trunk firmly but also with a minimum of abrasion. The yieldable nature of the back-up pad 136 augments the positive yet safe grip on the trunk as clamping and shaking takes place. As wear occurs, the buffering cushions 130 can readily be replaced.

Although the movable components of the apparatus of the invention 12 can be actuated in several different ways, the embodiment disclosed herein successfully incorporates a hydraulic system 151, shown schematically in FIG. 8.

The hydraulic pump 19, driven by a take-off from the engine 17, is connected by a fluid conduit 152, or line, to a reservoir 153, or tank. A filter 154 is inserted in the line in customary fashion.

The conduit 152 extends to an array of control valves centrally located at the console 35 for convenient manipulation by the driver-operator.

A detailed description of the various hydraulic valve mechanisms, hose fittings, and the like, is not deemed necessary, since all are conventional, off-the-shelf items.

Inclusive of the valves located at the control console 35 is a main valve 156 connected on one side to the main supply conduit 152 and on the other side to a fluid return line 157 extending back to the fluid reservoir 153.

In order to raise the boom 39 and the suspended tree gripping arms to the appropriate height for engagement with the tree trunk, the boom elevating valve 88 on the control console 35, and in communication with the high pressure fluid supplied by conduit 152, is actuated, as previously explained, so as to direct fluid through the hose 87 to the boom lifting cylinder 83, thereby retracting the plunger 84, which, by pulling rearwardly on the lever 86, elevates the boom about the pivotal mountings on the forward frame braces 33.

After the proper boom height is reached, the operator lets go of the actuating lever of the boom valve 88, and, in well-known manner, the boom remains in elevated position owing to the "self-locking" action of the valve. In order to lower the boom, the actuating lever of the boom valve 88 is tilted in the opposite direction from that previously followed and the weight of the boom 39 and the attendant arm structure drives the fluid located within the cylinder 83 back through the hose 87 as the plunger 84 is pulled forwardly by gravity. From the hose 87, the fluid driven from the cylinder 83 passes through the boom valve 88 to the fluid return line 157, thence back to the tank 153. Should the operator desire to stop the descending boom at any location, it is merely necessary to return the boom valve lever to neutral position when the desired boom elevation is reached.

Actuation of the arm clamping cylinder 63 is effected in a somewhat similar fashion except that the cylinder 63 is double acting, owing to its connection both with the hose 76 and the hose 77. As previously indicated, the arm control valve 78 on the console 35 enables the operator to open or close the tree gripping arms 42 and 43 at will. Owing to the necessity of holding the arms together very firmly, during the buffeting which takes place while shaking the tree, the additional locking valve 81 is provided. Locking valves of this type are conventional, catalog items. In order to open the clamping arms, the actuating lever of the clamping valve 78 is reversed, thereby deactivating the locking valve 81 and causing the plunger 62 to project to open position.

Hydraulic mechanism is also used to actuate the motors 91 and 123 of the left shaker head 48 and the right shaker head 49, respectively.

A shaker head control valve 176 on the console 35 is connected to high pressure fluid available at the main valve 156. From the shaker valve 176 the high pressure fluid is conducted by a hose 177 through a flow adjusting valve 178, or proportionator, which enables the operator to regulate the extent of flow through a left-hand supply line 179 or a right-hand supply line 180 extending to the left-hand motor 91 and the right-hand motor 123, respectively.

Preferably, the flow adjusting valve 178 is regulated so that the left-hand weight mass 103 revolves at 1,000 to 1,800 rpm, whereas the right-hand weight mass 113 revolves at about 600 rpm. Different crops at different stages will be shaken loose at various speeds. Experience will soon teach what relative speeds (as between left and right weight masses) as well as absolute speeds (in rpm's) will afford the best yield.

It is to be noted that whereas relative speed between the two vibrating head systems 48 and 49 is controlled by adjustment of the proportioning valve 178, the absolute speed imparted to the revolving masses 103 and 113 is governed by the extent of opening given the shaker valve 176. By appropriate regulation of the two valves and by adding to or removing metal to the respective masses a multitude of random vibrational impulses can be imparted to the tree trunk.

From the left hand hydraulic motor 91, the return to the fluid reservoir 153 is through the line 181; from the right hand motor 123, return is through the line 182.

It can therefore be seen that I have not only provided a compact, maneuverable tree shaker, but one in which the gripping arms automatically conform to trunk attitude virtually at right angles to the arm axis, and in which a large and widely variant array of shaking actions can readily be made available depending on the nature of the crop and the tree.

What is claimed is:

1. A tree shaker comprising:
   a. a frame;
   b. a boom mounted at one end on said frame;
   c. a pair of elongated, fore and aft, tree gripping arms suspended from said boom, the after ends of said arms being pivotally connected to each other, the forward ends of said arms being movable between a first, open position and a second, tree gripping position;
   d. first and second dissimilar weights mounted for rotation about a vertical axis on each of the respective forward ends of said arms for shaking the tree in said second position of said arms, said first weight being fan-shaped and mounted in a substantially horizontal plane, said first weight subtending in plan a relatively extensive arc and possessing a first predetermined moment of inertia, said second weight comprising a radially oriented plate mounted in vertical attitude and subtending in plan a relatively small arc, said second weight possessing a second predetermined moment of inertia differing substantially from said first moment of inertia;
   e. means for rotating said weights; and,
   f. means for moving said arms between said first and said second positions.

2. A tree shaker as in claim 1 in which said weight rotating means includes adjustable means for selectively controlling the rotational velocity of said weights.

3. A tree shaker as in claim 1 in which the extent of the arc in plan subtended by said fan-shaped first weight is approximately 3½ to four times the extent of the arc in plan subtended by said second weight.

4. A tree shaker as in claim 1 in which the extent of the arc in plan subtended by said fan-shaped first weight is approximately 170° and the extent of the arc in plan subtended by said second weight is approximately 45°.

5. A tree shaker as in claim 1 in which said one end of said boom is pivotally mounted on said frame for movement in a vertical direction; and in which said shaker includes lifting means connected to said boom for selectively elevating said pair of tree gripping arms suspended from said boom.

6. A tree shaker as in claim 5 in which said pair of tree gripping arms is suspended from said boom at three points including a pair of transversely spaced, forward points, and a single, central, after point.

7. A tree shaker as in claim 6 in which said three-point suspension is flexible in order to afford a freedom of motion to said tree gripping arms to tilt about the central fore and aft axis of said arms so as to conform to the attitude of a tree trunk being gripped.

8. A tree shaker as in claim 7 wherein said arms are connected to said boom at said pair of forward, transversely spaced, suspension points by a pair of chains.

9. A tree shaker as in claim 8 in which said arms are connected to said boom at said single, central after point by a laterally and longitudinally flexible member capable of maintaining said boom and said arms in a substantially fixed vertically spaced relation.

10. A tree shaker as in claim 1 in which said weight rotating means include hydraulically actuated motors; and in which said arm moving means include an hydraulic cylinder.

11. A tree shaker as in claim 10 in which said frame is carried on a self-propelled vehicle.

12. A tree shaker as in claim 1 including a pair of elastomeric buffering pads on said forward ends of said arms for protecting the trunk of a tree interposed between said pads in said second position of said arms.

* * * * *